Figure 1:
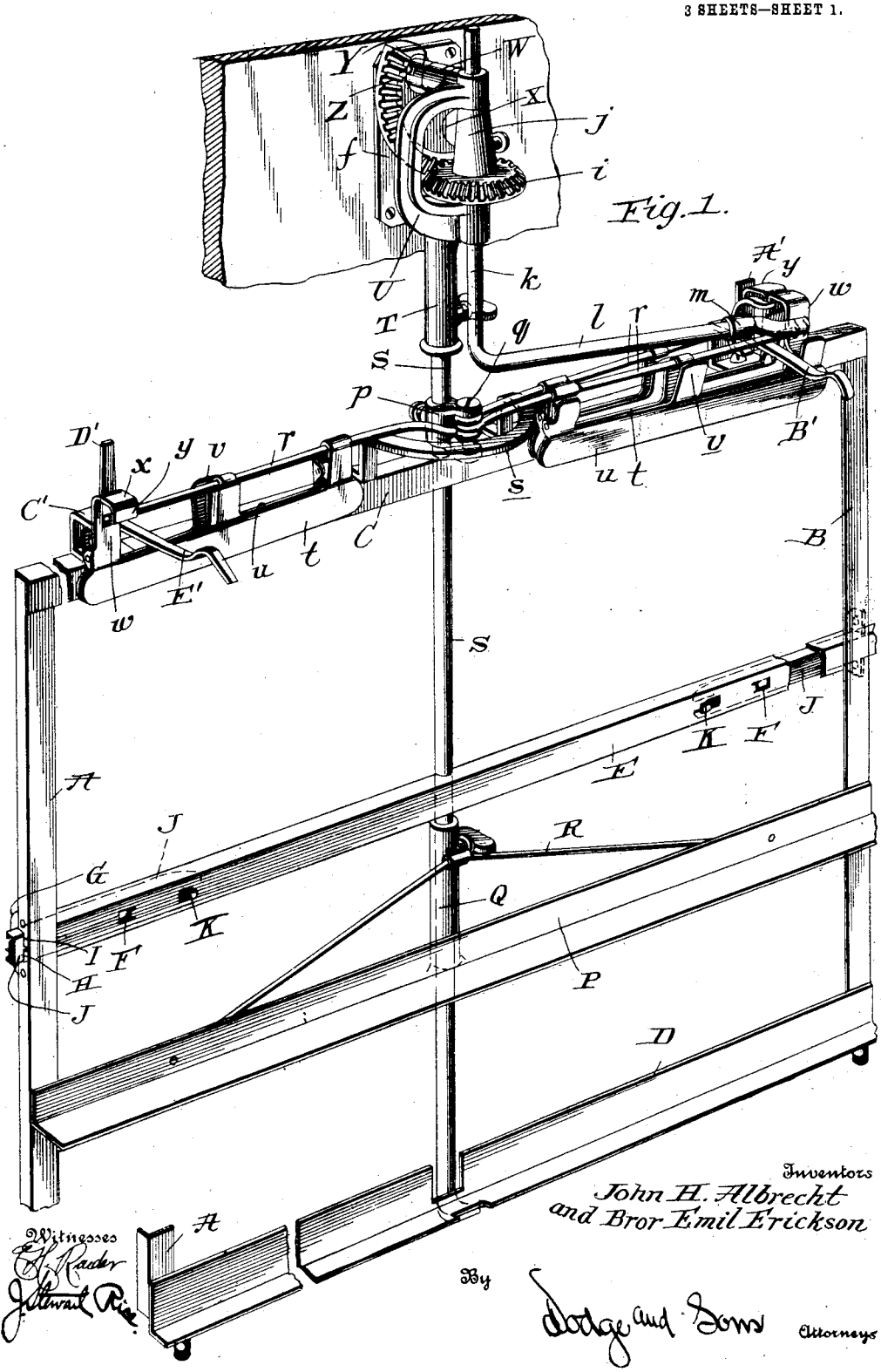

No. 866,554. PATENTED SEPT. 17, 1907.
J. H. ALBRECHT & B. E. ERICKSON.
LEAF TURNER.
APPLICATION FILED MAY 31, 1906.

3 SHEETS—SHEET 1.

Inventors
John H. Albrecht
and Bror Emil Erickson

By Dodge and Sons Attorneys

Witnesses

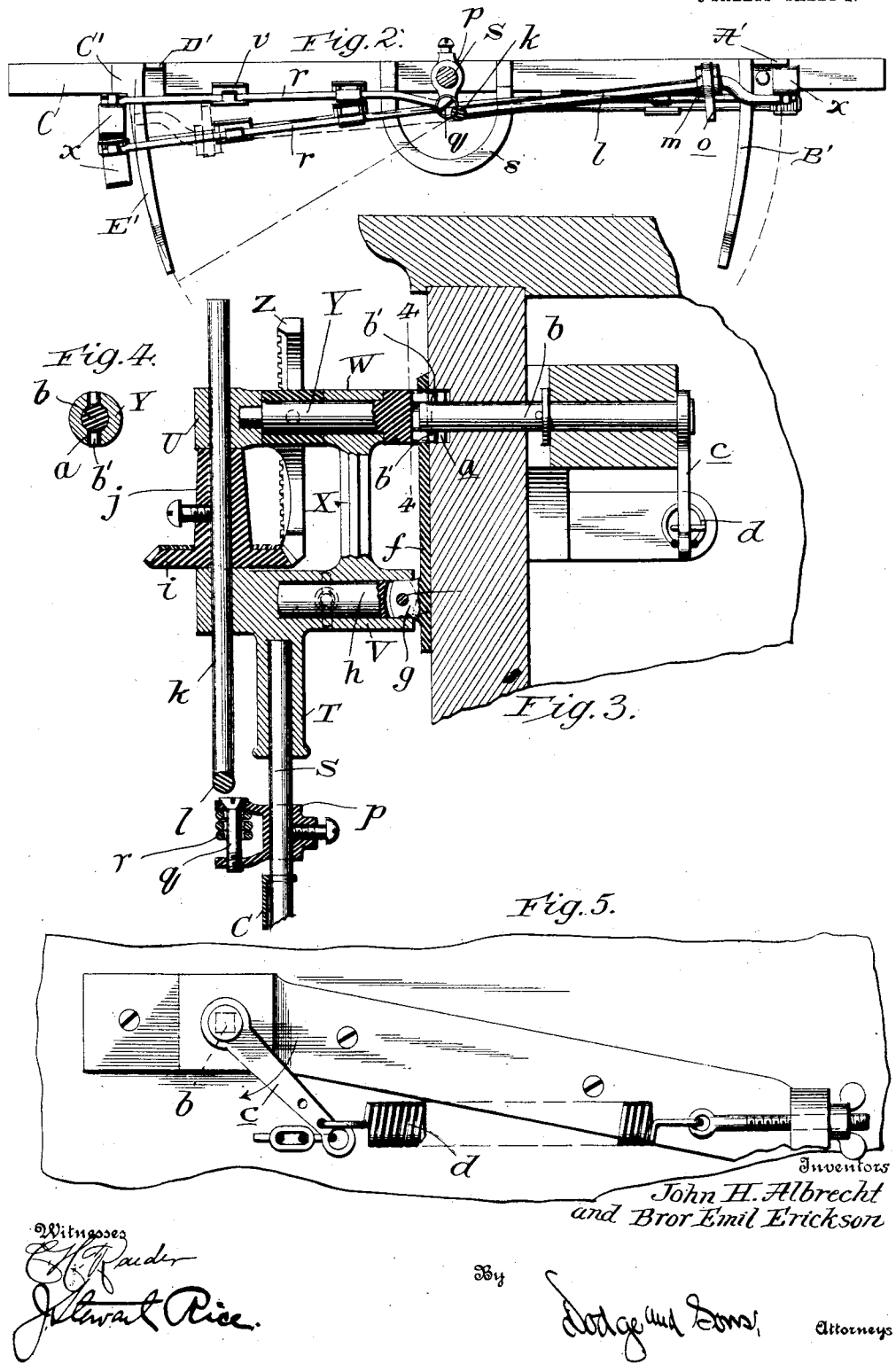

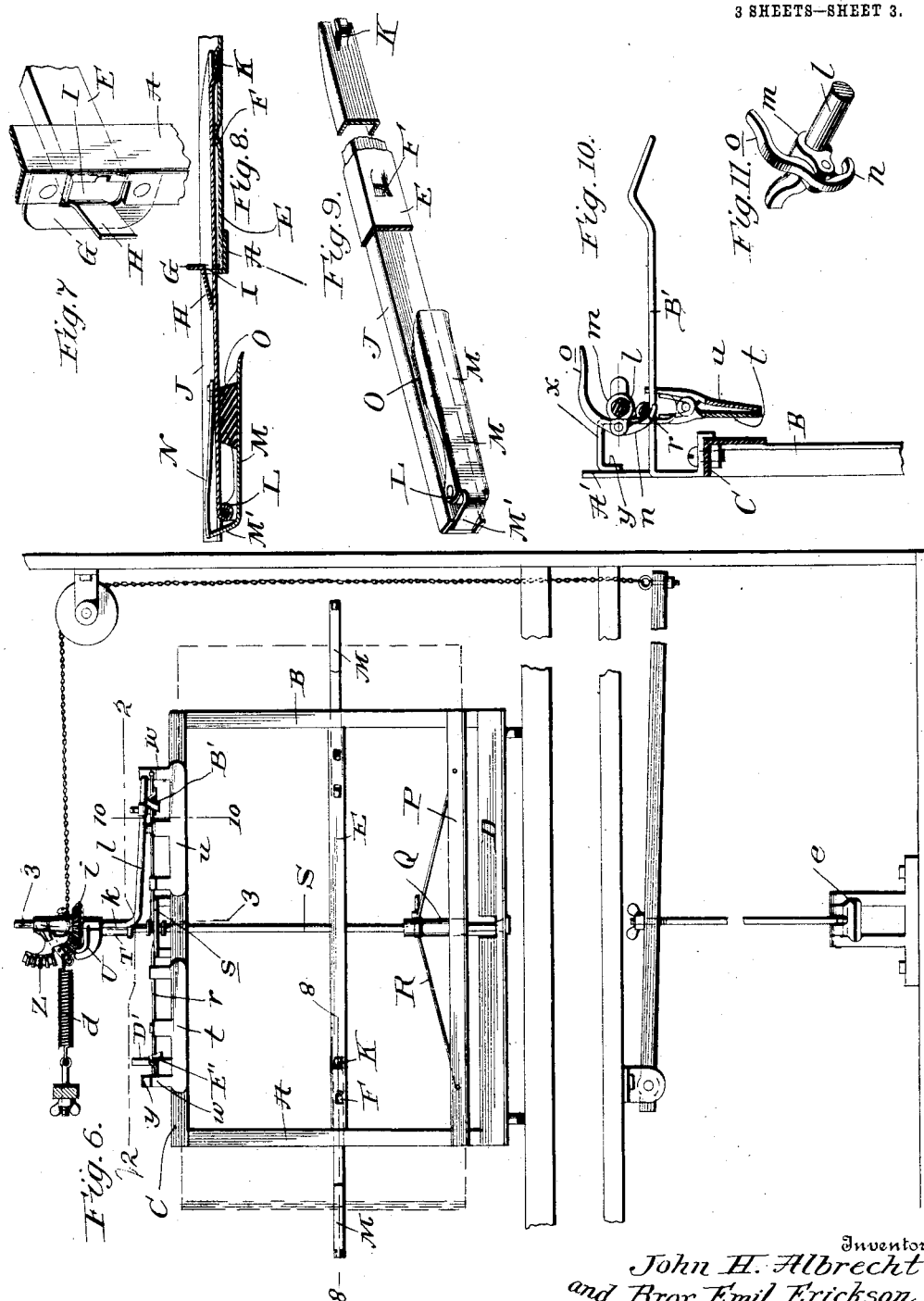

UNITED STATES PATENT OFFICE.

JOHN H. ALBRECHT AND BROR EMIL ERICKSON, OF MADISON, WISCONSIN.

LEAF-TURNER.

No. 866,554.  Specification of Letters Patent.  Patented Sept. 17, 1907.

Application filed May 31, 1906. Serial No. 319,554.

*To all whom it may concern:*

Be it known that we, JOHN H. ALBRECHT and BROR EMIL ERICKSON, citizens of the United States, residing at Madison, in the county of Dane and State of Wisconsin, have invented certain new and useful Improvements in Leaf-Turners, of which the following is a specification.

Our present invention pertains to improvements in leaf turners, the construction and advantages of which will hereinafter appear, reference being had to the annexed drawings, wherein:

Figure 1 is a perspective view of the device, portions being broken away; Fig. 2, a horizontal sectional view taken on the line 2—2 of Fig. 6; Fig. 3, a vertical sectional view, on an enlarged scale, taken on the line 3—3 of Fig. 6; Fig. 4, a vertical detail sectional view on the line 4—4 of Fig. 3; Fig. 5, a rear elevation of a portion of the actuating mechanism; Fig. 6, a front elevation of the device and actuating mechanism; Fig. 7, a perspective view of a portion of the main frame and the friction retaining-finger for one of the leaf-holding arms and fingers; Fig. 8, a horizontal sectional view of said parts, taken on the line 8—8 of Fig. 6; Fig. 9, a perspective view of one of the arms and fingers; Fig. 10, a vertical sectional view on the line 10—10 of Fig. 6; and Fig. 11, a perspective view of the gravitating latch which successively engages the arms that support the leaf clamps.

The object of our invention is to provide a simple and efficient leaf turner,—one which may be readily placed in position and attached to the operative mechanism, and as readily detached and removed from the piano or other instrument.

The main frame of the structure comprises two vertically disposed L-shaped side bars A and B, a similarly L-shaped top bar C, and a bottom bar or shelf D, the various members being securely fastened together.

A bar E, preferably L-shaped in cross section, extends across the frame, being secured to side bars A, B. Said bar E tends to stiffen the frame and also serves as a support for the outwardly extending adjustable book-clamping arms and fingers, one of said devices being mounted in each end of bar E. Inasmuch as each of the arms and fingers is alike in construction and operation, a description of one will suffice. Bar E, adjacent to the side bar, is provided with a series of openings F in its vertically disposed face.

A loop G, provided with an outwardly extending retaining-finger H, is secured to the side wall of the side bar, immediately adjacent to an opening or notch I, formed therein.

The adjustable arm is composed of a trough or U-member J, provided at its rear end with an offset lug or nose K, which, when the parts are positioned, enters one of the openings F in cross bar E. Owing to the shape of the parts and the contact of lug H with the rear face of member J, said member may be moved upon a slight application of outward pressure and a slight pull, yet will not become accidentally displaced.

The outer end of the arm is provided or formed with an eye L, to which is pivotally secured a finger M, said finger being formed with a nose M′, which coacts with a spring N secured to arm J, and holds the finger in an open or closed position. The finger will preferably be provided with a rubber bearing face O.

By moving the arms in and out, the book cover or back and those leaves which it is not desired to turn may be readily held in position, the lower edge of the book at such time resting upon the adjustable shelf P,— see Fig. 6.

Shelf P is secured to a sleeve Q, from which extends sustaining rods R, the sleeve encircling a vertically disposed rod S. The lower end of said rod is secured to the cross bar D of the main frame, being also secured to cross bar E, and passing through the upper bar C, above which it extends.

To the upper end of rod S there is secured a frame or casting, said frame being formed with a socketed arm T, into which rod S extends, a substantially U-shaped yoke U, a socketed arm V, and a fixed bearing W carried on an arm X. A shaft Y, having a sector gear Z secured to it, is mounted in the fixed bearing W, the reduced end of said shaft extending into an opening or bearing formed in the upper portion of yoke U. The opposite and enlarged end of shaft Y is bored out and is provided with a cross notch $a$, adapted to receive the actuating shaft $b$ and the cross pin $b'$ carried thereby. To the inner end of shaft $b$ is secured a lever $c$, a spring $d$ serving to draw said lever to the right (Fig. 5), in opposition to the pedal $e$ and the interposed lever and chain employed for actuating the shaft to turn the leaves, all of said parts being within the piano casing.

A face-plate $f$ is secured to the front board of the piano, and is provided with an opening for the admission of shaft Y. Said plate is also provided with a lug $g$, to which is pivotally secured an arm $h$, designed to pass into the socketed arm V, and to be held therein by a thumb-screw, preferably arranged at one side of the arm, as shown in dotted lines in Fig. 3. This arrangement permits the ready attachment of the leaf-turning device proper to the actuating mechanism, the pivoting of the supporting arm $h$ preventing any clamping or binding of the parts.

Sector gear Z meshes with a gear $i$, which, as will be seen upon reference to Figs. 1 and 3, is provided with an elongated hub or sleeve $j$, both sleeve and gear being of a length sufficient to make a neat fit in the yoke U. A vertically disposed shaft $k$ passes through bearings formed in the yoke and also through the gear and sleeve, being secured to said members by a suitable set-screw. The lower end of the shaft is bent outwardly at right angles to the vertical portion, forming a horizontally disposed arm $l$, the outer end of which, as will be seen best in Figs. 2 and 11, being offset and slightly flattened. Immediately adjacent to said offset portion is secured a sleeve or bracket $m$, in which is pivotally mounted a gravitating latch, provided with a lower hooked portion $n$ and an upper overhanging finger-piece $o$, the latter being of such weight and greater length as normally to throw the hooked portion down and away from the arm $l$.

Secured to the rod S, above the top bar C, is a bracket $p$, carrying a bolt or screw $q$, constituting a pivot for a series of arms $r$, to which the leaf clamps are attached. Screw $q$ stands to the left of shaft $k$ (see Figs. 2 and 6), the parts being eccentric to each other, for a purpose which will presently appear.

Secured to bar C is a curved bracket or member $s$, which serves to support the arms $r$ as they are moved from right to left in the act of turning the leaves.

Each of the leaf clamps or holders comprises a plate $t$ fixedly suspended from an arm $r$, and a plate $u$ hinged to plate $t$, and spring-pressed toward the same. Plate $u$ is provided with a finger-piece $v$ to permit the jaws to be readily opened. Plate $t$ is provided at its outer end with an upwardly projecting arm $w$, which, as will best be seen upon reference to Fig. 1, is bent or formed so as to produce a horizontally disposed portion $x$ and a downwardly projecting section or finger $y$, the member thus produced constituting a combined stop-and-spacing device for the clamp.

Secured to cross bar C, adjacent to the right-hand end thereof, is a stop-plate A′ against which finger $y$ of the innermost leaf clamp abuts when it is moved to the right. A supporting arm or bar B′ extends outwardly from plate A′, said bar being formed with a slight swell or raised portion near its outer end to prevent accidental displacement of the arms $r$. A second stop-plate is provided at the left-hand side of the frame, said plate being formed with a stop C′ for the leaf clamps, and an upwardly extending stop-arm D′ for arresting the rearward movement of arm $l$ when it is swung around with the first leaf clamp, or in case it should be swung around without the clamps. A supporting arm E′, similar in form to arm B′, extends outwardly from the second stop-plate.

The operation of the apparatus is as follows: Assuming that shelf P has been adjusted to bring the leaves of the book resting thereon into position to be engaged at their upper edges by the clamps, the back or cover of the book and the leaves which are not to be turned will be engaged and held fast by the fingers M, the arms J having been first adjusted to the desired position. The arms $r$, with the attached leaf clamps, are then swung around to the right, resting upon arm B′, the leaves having been previously engaged by the clamps. Arm or lever $l$ is then permitted to swing to the right under stress of spring $d$, the outer end of said arm coming into contact with arm $w$ and being arrested thereby. At the same time, hook $n$ will ride over and pass in rear of the outer arm $r$ of the series, ready to engage the same when treadle $e$ is depressed and the arm $l$ swung to the left through the connections before described. As arm $l$ is swung to the left, arm $r$ and its attached leaf clamp will move with it, arm $r$ riding off support B′ and passing onto support E′ until arm $w$ comes into contact with stop C′. As the two arms, $l$ and $r$, swing to the left, the former will be gradually drawn out of contact with arm $w$, owing to the eccentric arrangement of the pivotal points of said arms, so that when the treadle is released, arm $l$ may swing back alone to engage the next clamp supporting arm at the right. This operation will continue as long as any leaves remain to be turned.

It will of course be understood that the arrangement shown in Fig. 6 for actuating the mechanism is merely illustrative and may be modified as desired.

Having thus described our invention, what we claim is:

1. In combination with a frame, a rod extending above the same; a casting supported upon the upper end of the rod; an arm pivotally supported by said casting; gearing for swinging said arm back and forth; a series of leaf clamps; a pivotal support for the inner ends of said clamps, said support being eccentric to that of the arm; a combined stop-and-spacing device carried by each clamp; and a gravitating hook carried by the arm.

2. In combination with a main frame, a laterally swinging arm; a gravitating hook carried thereby; a series of pivotally mounted leaf clamps, the axis of said clamps being out of line with that of said swinging arm; a combined stop-and-spacing device carried by each leaf clamp; and means for holding the clamps at each side of the frame.

3. In combination with a frame, a laterally swinging arm; a gravitating hook carried thereby; a series of swinging leaf clamps, the axis thereof being to one side of that of the arm; a combined stop-and-spacing device carried by each clamp; a support at each side of the frame to sustain the outer ends of the clamps; and a stop carried by the frame at each side thereof and in line with the clamps.

4. In combination with a frame, a laterally swinging arm; a gravitating hook carried thereby; a series of swinging leaf clamps, the axis thereof standing out of line with that of the arm; a combined stop-and-spacing device carried by each clamp; a stop arranged at the right of the frame in line with the clamps; a second stop arranged at the left of the frame in line with the clamps when they are moved to that side of the frame; a stop-arm for the swinging arm; and supports for the clamps extending outwardly from each side of the frame.

5. In combination with a face-plate, an arm pivotally secured thereto; an actuating shaft extending into an opening formed in the plate; leaf-turning mechanism; gearing for actuating the same; a casting or frame for supporting said gearing, said casting being formed with a socket to receive the pivoted arm; and driving connections between said gearing and the actuating shaft.

6. In combination with a frame, leaf-turning mechanism carried thereby; a casting carried by the frame; gearing carried by the casting for operating the leaf-turning mechanism; a face-plate adapted to be secured to a piano or the like; an arm pivotally secured to said face-plate and arranged to be clamped in a socket formed in the casting; an actuating shaft extending into an opening formed in the face-plate; and means for detachably connecting said shaft to the gearing.

In testimony whereof we have signed our names to this specification in the presence of two subscribing witnesses.

JOHN H. ALBRECHT.
BROR EMIL ERICKSON.

Witnesses:
J. J. McManamy,
E. E. Albrecht.